United States Patent [19]
White

[11] Patent Number: 5,830,358
[45] Date of Patent: Nov. 3, 1998

[54] METHOD AND APPARATUS FOR DECOMPOSITION OF ORGANIC WASTE

[75] Inventor: Allen E. White, Millerton, Pa.

[73] Assignee: Bio-Sun Systems, Inc., Millerton, Pa.

[21] Appl. No.: 625,120

[22] Filed: Apr. 1, 1996

[51] Int. Cl.[6] .......................... B01D 61/00; B01D 63/00
[52] U.S. Cl. .................. 210/650; 210/609; 210/257.1; 210/416.1; 210/542; 210/321.6; 4/449; 4/DIG. 12; 4/DIG. 19; 71/9
[58] Field of Search .................... 210/650, 620, 210/651, 321.6, 532.1, 536, 150, 609, 257.1, 290, 542, 416.1; 71/9, 12, 11, 14; 4/449, DIG. 2, DIG. 19; 435/290.4

[56] References Cited

U.S. PATENT DOCUMENTS

| | | | |
|---|---|---|---|
| 3,543,294 | 11/1970 | Boester | 4/DIG. 12 |
| 3,673,614 | 7/1972 | Claunch | 4/DIG. 19 |
| 3,864,258 | 2/1975 | Richardson et al. | 210/149 |
| 3,974,528 | 8/1976 | Claunch et al. | 4/DIG. 19 |
| 4,063,315 | 12/1977 | Carolan et al. | 4/DIG. 19 |
| 4,096,592 | 6/1978 | Clark | 4/111 |
| 4,134,749 | 1/1979 | Houser et al. | 71/9 |
| 4,254,515 | 3/1981 | Kiyama et al. | 4/DIG. 19 |
| 4,302,236 | 11/1981 | Roman | 210/609 |
| 4,608,175 | 8/1986 | Nuttle | 210/532.2 |
| 5,005,227 | 4/1991 | White | 4/449 |
| 5,207,904 | 5/1993 | Abel | 210/257.1 |
| 5,312,754 | 5/1994 | Bryan-Brown | 435/290 |
| 5,545,560 | 8/1996 | Chang | 210/290 |
| 5,597,732 | 1/1997 | Bryan-Brown | 435/290.4 |

OTHER PUBLICATIONS

"Technology for Waste Treatment at Remote Army Sites." USA–CERL, Technical Report N–86/20, Dec. 1986—Remote Site Waste Management.

WRS™ Model 1500 Series Manufactured by Bio–Sun Systems, Inc., May 1995.

*Primary Examiner*—Ana Fortuna
*Attorney, Agent, or Firm*—James A. Drobile; Michael B. Fein

[57] ABSTRACT

A waste decomposition system, having a container and an air circulation system integrated into the container. The air circulation system has a positive air pressure source; and a negative air pressure source. Also a method for decomposition of liquid and solid organic waste, including the steps of: (a) providing a container for collecting the waste; (b) forcing air through the waste with a positive air pressure source; (c) withdrawing air from the container with a negative air pressure source.

11 Claims, 7 Drawing Sheets

METHOD AND APPARATUS FOR DECOMPOSITION OF ORGANIC WASTE

FIELD OF THE INVENTION

The present invention concerns waste decomposition systems. More particularly, the present invention concerns apparatuses for waterless decomposition of organic wastes.

DESCRIPTION OF THE RELATED ART

There are two basic mechanisms for the decomposition of organic waste, anaerobic and aerobic. Anaerobic decomposition involves the use of anaerobic microorganisms to breakdown waste materials into more basic elements. Aerobic decomposition involves the use of aerobic microorganisms to breakdown waste materials into more readily usable basic elements. Aerobic decomposition of organic waste generally occurs far more rapidly than anaerobic decomposition. However, in order for aerobic decomposition to proceed, the aerobic microorganisms must be supplied with oxygen. The ability to maximize the oxygen supply to the aerobic microorganisms in a waste decomposition system is one of the most significant limiting factors on the efficiency of those systems.

There are two basic types of systems in use for the decomposition or organic waste, whether by anaerobic or aerobic decomposition: (1) water-based systems; and (2) dry systems.

Water-based systems employ water to transfer waste to a remote processing site, either a septic system or a sewage treatment system. Water based systems are relatively easy to aerate. Unfortunately, water-based systems are wasteful of water and are highly polluting. In addition, water-based systems are relatively large, complex and expensive compared to dry systems. As a result, water based systems are impractical in many situations, particularly where water is relatively scarce. In particular, because of contamination caused by standard septic tank/leach field systems, new residential and commercial building is being restricted in many areas where standard septic systems would be the method of sewage disposal. Further, mechanical/chemical microbial and nutrient treatment systems are being specified and mandated for existing dwellings in environmentally sensitive regions, such as lakefronts, seashore areas, wetland areas, aquifer recharge areas and the like.

By contrast, dry systems do not require the use of water and are non-polluting. Moreover, dry systems are generally relatively smaller, simpler and less expensive. Unfortunately, dry systems are relatively difficult to aerate. As a result, decomposition rates in known dry systems are relatively slow.

One reason dry systems are relatively difficult to aerate is the progressive biomass settling, compression and stratification which occurs in the waste piles and results in the progressive decrease in interstitial free air (oxygen) volume. The loss of interstitial free air reduces aeration and slows the rate of aerobic decomposition. Some dry systems have attempted to remedy this problem by using passive flow-by venting systems. Such systems, however, cannot increase or recharge the interstitial air space.

Another reason known dry systems are difficult to aerate is that excess process liquids tend to accumulate and restrict airflow across the waste. Such liquids must be either evaporated or drained to permit aeration.

As a result, known dry waste decomposition systems require periodic manual stirring and turning of waste piles to ensure adequate aeration. Such stirring and turning is laborious and unpleasant. Moreover, stirring and turning must be conducted relatively frequently to ensure maximum aeration.

Accordingly, it is a principal object of the present invention to provide an on-site natural organic waste treatment system to replace sewerage systems and septic systems.

It is a further object of the invention to save water by limiting or preventing the usage of water for the purpose of conveying organic wastes to treatment locations.

It is a further object of the invention to prevent contamination and pollution of surface and sub-surface soils and waters by limiting or preventing the production and discharge of sewage as it is commonly defined.

It is a further object of the invention to maximize the rate of waste decomposition without manual stirring or turning of waste piles.

It is a further object of the invention to enhance the evaporation rate of excess process liquids.

It is a further object of the invention to utilize the heat gained through the regenerative compression of the entrainment air to accelerate the activity of natural, beneficial, predatory, aerobic organisms to a high enough level to ensure the production of a stable, safe, odor-free, nutrient-rich end product which may be directly reusable as a soil amenity/fertilizer.

It is a further object of the invention to reduce the amount of time required to convert a design amount of organic waste to its smallest volume and least active compost state of analysis.

It is a further object of the invention to reduce or eliminate the production and emanation of the malodorous compounds normally associated with the anaerobic decay of organic wastes. The malodorous compounds of primarily hydrogen sulphide and the fatty acid group consisting of butyric, caproic, caprylic and capric acid are only produced in the absence of oxygen.

It is a further object of the invention to provide an isolated, actively aerated (compressed air entrained) finishing chamber for the retention, nitrification and super stabilization of the organic waste prior to removal and reuse as a soil amenity/fertilizer.

Further objects and advantages of this invention will become apparent from the detailed description of a preferred embodiment which follows.

SUMMARY OF THE INVENTION

The present invention is directed to a waste decomposition system, comprising (1) a container and (2) an air circulation system integrated into the container comprising (a) a positive air pressure source and (b) a negative air pressure source.

The present invention is also directed to a method for decomposition of liquid and solid organic waste, comprising the steps of: (a) providing a container for collecting the waste; (b) forcing air through the waste with a positive air pressure source; (c) withdrawing air from the container with a negative air pressure source.

BRIEF DESCRIPTION OF THE DRAWINGS

Other objects, features, and advantages of the present invention will become more fully apparent from the following detailed description of the preferred embodiment, the appended claims, and the accompanying drawings in which:

DETAILED DESCRIPTION OF THE PREFERRED EMBODIMENT(S)

Figure 1:
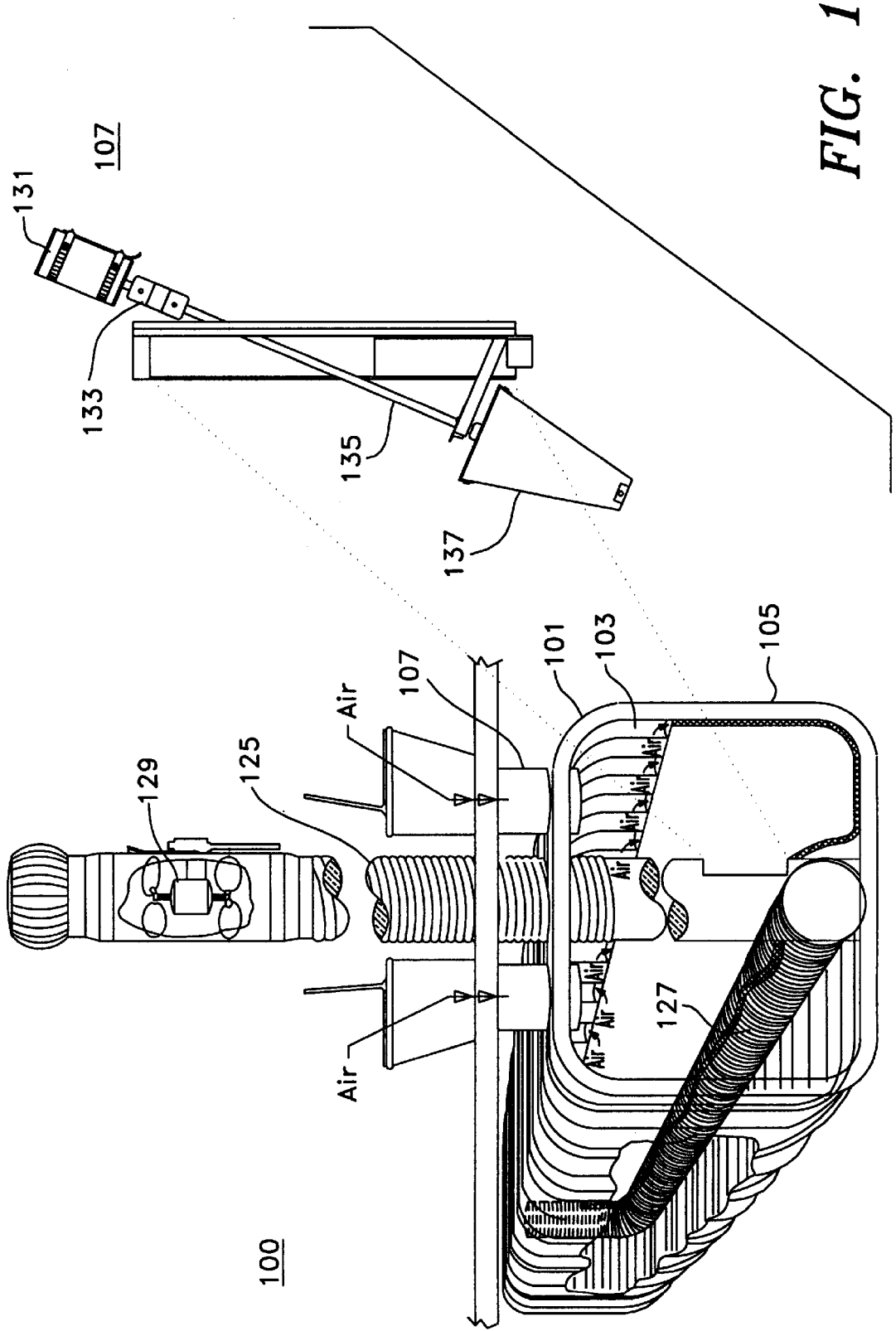
FIG. 1 is a perspective view of a waste decomposition system in accordance with a preferred embodiment of the present invention.
Figure 2:
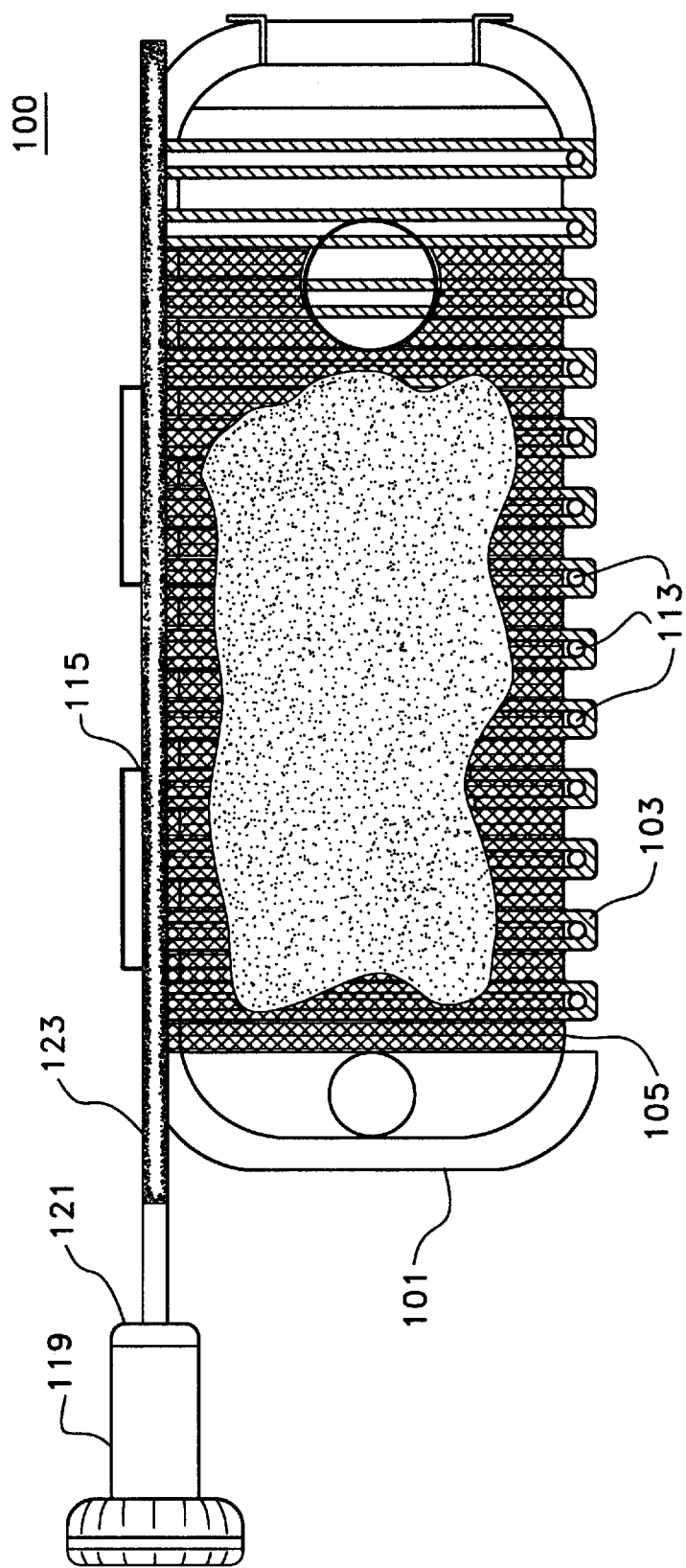
FIG. 2 is a top, cut-away view of the waste decomposition system of FIG. 1.
Figure 3:
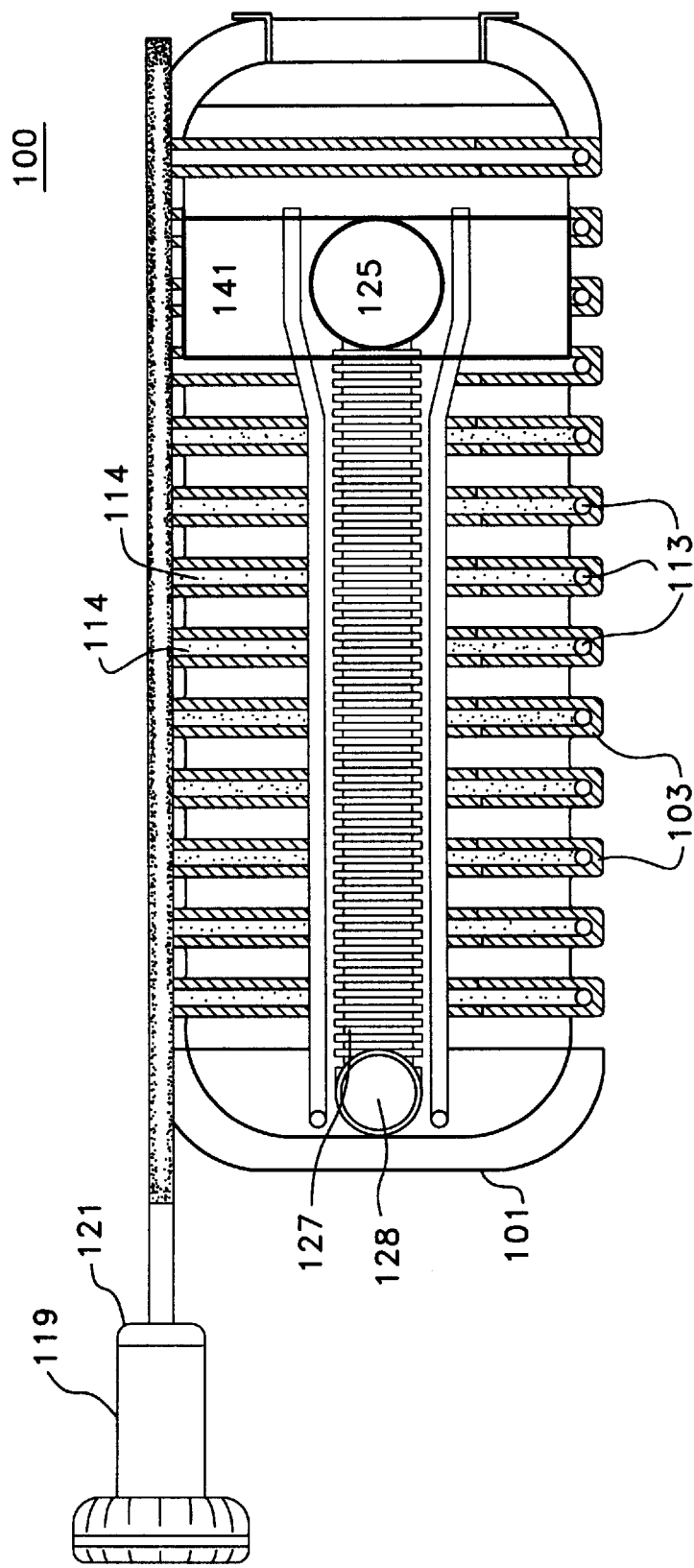
FIG. 3 is a another top, cut-away view of the waste decomposition system of FIG. 1.

Referring now to FIGS. 1–6, the present invention comprises a container 1 and an air circulation system, both designed to maximize aerobic decomposition of organic wastes by maximizing aeration.

The container 101 comprises waste channels 103, a porous membrane 105, waste input chutes 107, access panel 111, and waste finishing chamber 141.

The container 1 may be formed of any durable, leak proof material with sufficient structural integrity to support its own weight and any structures or fixtures attached thereto. In a preferred embodiment, the container 1 is made of linear high density polyethylene (HDPE). In an alternative embodiment, the container 1 is made of sealed, waterproof concrete.

Figure 4:
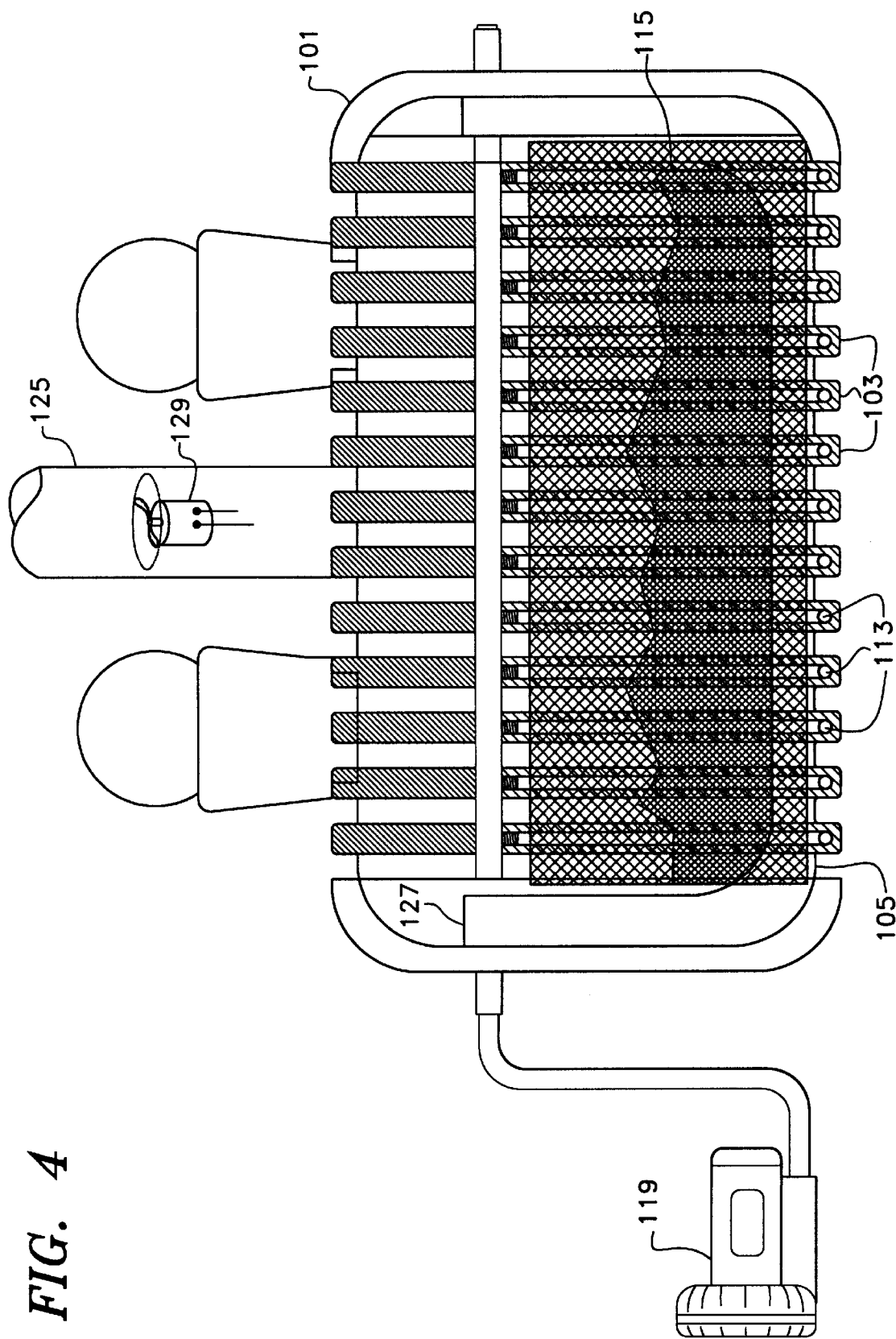
FIG. 4 is a side, cut-away view of the waste decomposition system of FIG. 1.

The container 101 is formed to have a multiplicity of recessed channels 103 over its entire inner surface area. The channels 103 are provided as receiving locations for the air supply diffuser pipes 113 described below. The channels 103 are preferably approximately preferably 2 inches wide, and are spaced approximately 4 to 12 inches apart, center to center. In a preferred embodiment, the channels 103 are formed by providing a ribbed container 101 as shown in FIG. 4. The recessed areas of the ribbed container 101 serve as the air supply diffuser pipe channels 113.

The container 101 also comprises various waste input chutes 107 as well as other openings necessary to admit the various components of the air circulation system described below. The container 101 also comprises access panel 111.

The container also comprises a covered waste finishing chamber 141. Covered waste finishing 141 chamber is a relatively small portion of the container located adjacent to the access panel 111 large enough to hold accumulated decomposed waste generated over approximately one year. In preferred embodiments of the present invention having containers of approximately 500 to 1500 gal., the waste finishing chamber 141 may be approximately 1 to 4 ft.$^3$ The air diffuser pipes 103 (described below) run through the bottom of the finishing chamber 141 in the same manner as through the rest of the container 101. As solid waste 115 accumulates in the container 101, the system operator pushes the accumulated waste away from the access panel 111 and chute 107 bottom, to the back and sides of the container 101. After approximately one year, depending upon usage rate, the accumulated partially decomposed waste may be moved into the waste decomposition chamber 141. After approximately 1 year, all of the oxygen requirements of the waste in the waste decomposition chamber have been satisfied and the waste is reduced to 20-12-14 NPK (about 20% by weight $NO_3$, about 12% by weight $PO_4$, and about 14% by weight K) fertilizer with less than 200 e-coli per ml. All $CO_2$ and $H_2O$ by-products have been vented.

The container size is dependent upon the extent of the use. Specifically, the container 101 must be large enough that all waste can drop directly into the container 101. More importantly, the container 101 should be large enough to provide an air surface to mass volume ratio of waste of at least 1:1 at maximum capacity. Examples of different container sizes and capacities are set forth in Table 1.

|  | 1 | 2 | 3 |
|---|---|---|---|
| Tank Size (gal.) | 500 | 1000 | 1500 |
| # Of Air Supply Conduits | 12 | 14 | 18 |
| Actual Volume (ft.$^3$) | 65 | 130 | 200 |
| Actual Waste Capacity (ft.$^3$) | 56 | 112 | 168 |
| Surface: Volume at ½ Capacity | 2.63:1 | 1.5:1 | 1.5:1 |
| Surface: Volume at full Capacity | 1.63:1 | 1:1 | 1:1 |
| Solid Waste Inlets | 3 | 4 | 6 |
| Daily Average Usage Capacity | 180 | 250 | 300 |
| Daily Peak Usage Capacity | 1000 | 1500 | 1500 |
| Annual Usage Capacity | 65,700 | 91,250 | 109,500 |

Figure 5:
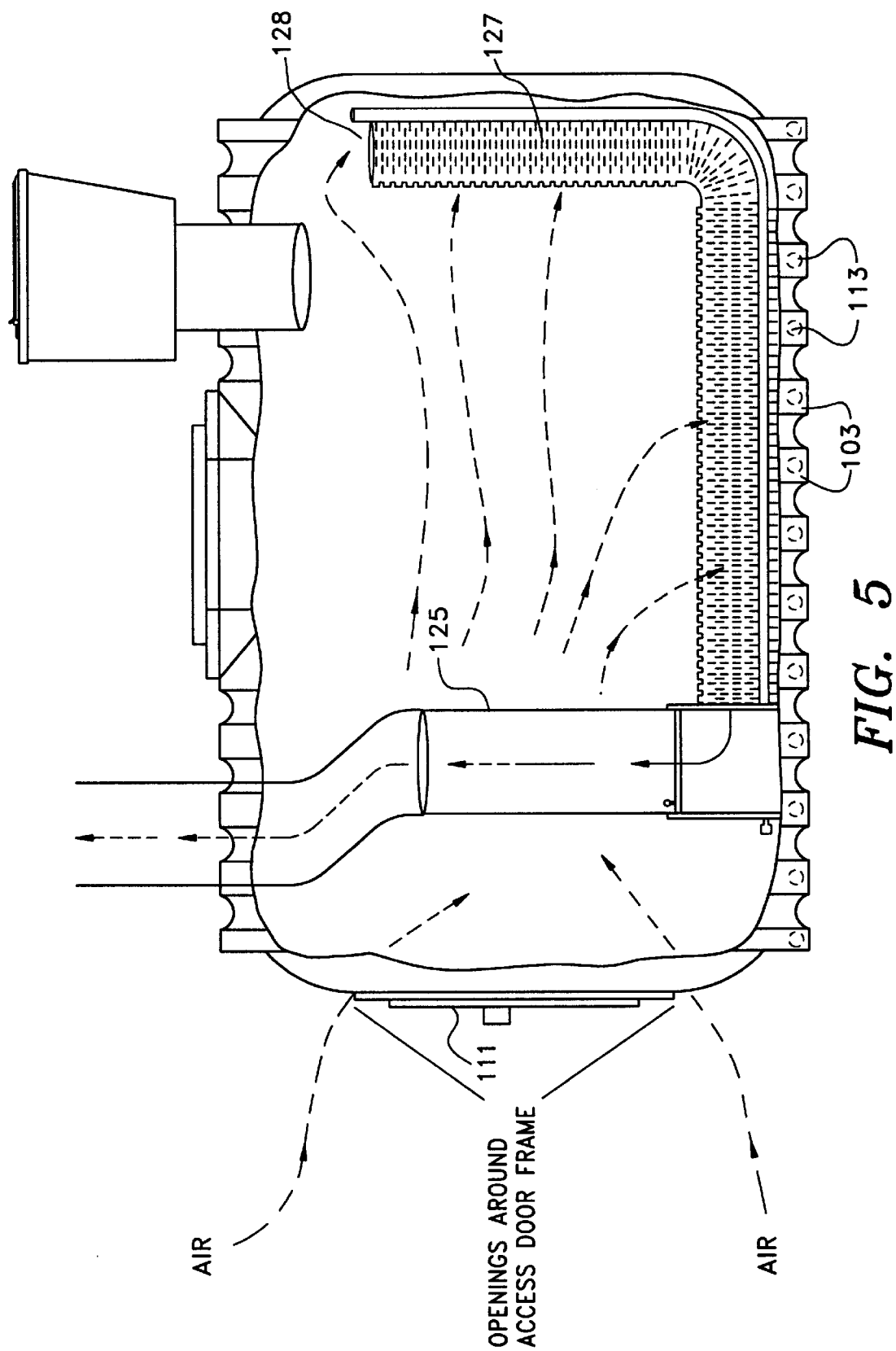
FIG. 5 is a side cross-sectional view of a container of the waste decomposition system in accordance with a preferred embodiment of the present invention.
Figure 6:
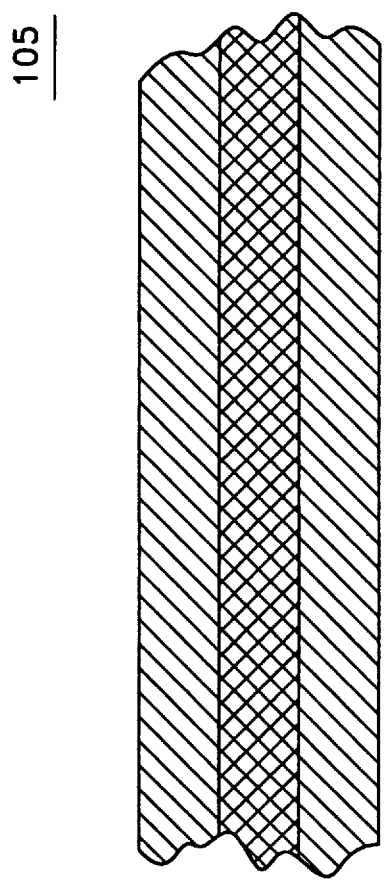
FIG. 6 is a side cross-sectional view of the membrane of the present invention.

The inner surface of the container 101 is preferably covered with a flexible, structural, pervious, inert membrane 105. As shown in FIG. 5, the membrane 105 is preferably made of an expanded polyethylene substructure with dual laminated, heat bonded, polypropylene fibrous batting, such as 6 ounce FABRINET™ manufactured by the Gundle Corporation. The membrane 105 is installed so that it covers the entire floor of the container 101 as well as approximately ¾ of the sidewalls of the container 101. As shown in FIG. 4, the membrane 105 does not follow the contours of the container 101 formed by the channels 4. The membrane 105 is adapted to receive and retain the solid raw waste material 115. Liquid waste (not shown) passes through the membrane 105, flows into the channels 103, and is directed to the vaporizer 117. Solid waste 115 is retained on the membrane 105 for decomposition.

The air circulation system comprises positive air pressure source 119, dehumidifier 121, air supply manifold 123, air supply diffuser pipes 113, exhaust vent 125, central air duct 122, and exhaust fan 129.

The positive air pressure source 119 may be any type of device capable of supplying sufficient pressure through the air circulation system. At a minimum, the positive air pressure source 119, must be able to maintain a minimum design airflow against the head pressure created by the anticipated design height of the liquid in the all of the channels 103. Thus, in a preferred embodiment where the maximum liquid height is 8 inches, the minimum pressure generated by the positive air pressure source 119 must be greater than that generated by 8 water column inches. In a preferred embodiment, the positive air pressure source 119 is capable of generating 29 ft.$^3$/min against the pressure of a 20 inch column of water. A preferred positive air pressure source 119 is the "Regenerative Blower" manufactured by Fuji Corp., model VFC 204P-5T. The positive air pressure source 14 should also provide sufficient air flow to aerate and, therefore, stabilize the maximum intended waste capacity. Minimum air flow rates may be calculated as follows:

1. One cubic foot of air contains approximately 7.73 g oxygen at sea level;

2. Available oxygen at a 50% interface efficiency=3.86 g/ft.$^3$;
3. Available oxygen at a 2.5% gas transfer efficiency= 0.096 g/ft.$^3$;
4. At 80° F., and 60% moisture, approximately 12 g oxygen are required for the complete conversion and stabilization of a single human toilet event;
5. Accordingly, approximately 125 ft.$^3$ of air is required for the complete conversion and stabilization of a single human toilet event;
6. If the average maximum daily usage of the waste decomposition system is 300 uses, the positive air pressure source should be capable of generating an air flow in excess of 300*125 ft.$^3$=37,500 ft.$^3$/day or approximately 26 ft.$^3$/min.

The positive air pressure source 119 is preferably controlled by an adjustable on/off timing device (not shown), such as the "Multi-Time Range/Multi-Function Relay" manufactured by Dayton Company and sold as product number 6A855.

The dehumidifier 121 is coupled to the positive air pressure source 119 and is designed to reduce humidity of the intake air, thereby improving evaporation efficiency of the liquid vaporizer 107. The dehumidifier 121 is preferably a desiccant cartridge type dryer, such as the "Main-Line Desiccant Air Dryer" sold by McMaster-Carr Company as part #4437K13.

The air supply manifold 123 is coupled to the positive air pressure source 119 and the air supply diffuser pipes 113 and serves to channel air from the air pressure source 119 to the air supply diffuser pipes 103. In a preferred embodiment of the present invention, the air supply manifold 123 is made from 2 inch diameter, schedule 40 PVC. The size of the manifold 123 is limited by the air-flow requirements of the system. Manifold 123 is preferably coupled to the interior of the container 101 for stability and is preferably positioned near the top of the container 101 for ease of fabrication and installation as well as access once the system is in use.

The air supply diffuser pipes 103 are coupled to the air supply manifold 123. The diffuser pipes 113 are adapted to fit within the channels 103 of the container 101. The diffuser pipes 113 are made from any flexible corrosion proof material. In a preferred embodiment of the present invention, the diffuser pipes 113 are made from ½ inch diameter polyethylene tubing. Each diffuser pipe 113 is drilled with a number of diffuser holes 114. The number and size of the diffuser holes 114 is determined by the pressure volume capacity and the size of the discharge pipe of the positive air pressure source 119 as well as the need to distribute the air to the waste. In a preferred embodiment, where the maximum working pressure is 20 water column inches, the minimum flow rate is 20 ft.$^3$/min., and the blower discharge pipe is 1 inch in diameter, air supply diffuser pipes 113 are preferably suppled with two holes 114, positioned on opposite sides of the air supply diffuser pipes 113, approximately every six inches. In a preferred embodiment, each hole is approximately 1/16 inch in diameter. The diffuser holes 114 are positioned across the portion of the diffuser pipes 113 that run along the bottom of the container 101 so as to ensure that maximum positive air pressure is delivered across the entire bottom of the container 101.

In a preferred embodiment of the present invention, the waste decomposition system further comprises additional air supply diffuser pipes running parallel to and positioned on either side of the central air duct 127.

The exhaust elements of the air circulation system include a central air duct 127, an exhaust vent 125, and a negative air pressure source 129.

The central air duct 127 serves to receive and direct gasses emitted from the waste piles 115 to the exhaust vent 125. The central air duct 127 directs and distributes vacuum pressure created by the negative air pressure source 129 through the central portions of the waste piles 115. The central air duct 122 is a perforated, flexible, structural, corrosion proof field drain pipe, such as that manufactured by the ADS corporation. In a preferred embodiment the central air duct 127 is approximately 8 inches in diameter. The originating end of the central air duct 127 is open and is preferably installed centrally and above the vertical midpoint of the container 101. The central air duct 127 runs under the membrane 105 from the originating point, down to the bottom of the container 101, across the bottom of the container 101, and terminates into the exhaust vent 125 at the opposite end of the container 101. The central air duct 127 is preferably positioned in the center of the container 101. The central air duct 127 is manufactured with perforations around its entire circumference and length.

The exhaust vent 125 serves to vent exhaust gasses received from the central air duct 127 as well as the process liquids which are vaporized by the vaporizer 107, which is itself positioned within the exhaust vent 125. The exhaust vent 125 is any structural, flexible, corrosion resistant ducting material, such as stainless steel, fiberglass, or PVC. In a preferred embodiment of the present invention, the exhaust vent 125 is approximately 12 inches in diameter. The originating end of the exhaust vent 125 rests on the inside bottom of the container 101. The exhaust vent 125 preferably extends upward through the top of the container 101 and through and out of roof of any structure housing the waste decomposition system 100 to a terminating point above the roof line of any such structure. The originating end of the exhaust vent 125 also receives and is the mounting place for the vaporizer 107, described below.

The vaporizer 107 serves to vaporize the excess process liquids that collect in the exhaust vent 125 at the bottom of the container 101. The vaporizer 107 comprises drive motor 131, flexible drive coupling 133, drive shaft 135, and funnel cone 137. The motor 131 is preferably a low power DC electric drive motor, such as part #PE2651V manufactured by Redmond Company. The flexible drive coupling 133 is adapted to couple the motor 131 to the drive shaft 135. The drive shaft 135 is preferably a ½ inch diameter and 23 inch long stainless steel drive shaft. The funnel 137 is adapted to rotate within the exhaust vent 125 and provide a surface for evaporation of excess process liquids. The vaporizer 107 is preferably mounted approximately 1 inch above the high portion of the bottom of the ribbed container 101. When the vaporizer 107 is activated, the funnel 137 rotates at about 800 rpm. Acting as a vortex centrifuge, the funnel draws liquid up the internal surface of the container such that the liquid is flung off of the top of the funnel onto a piece of high surface area material (such as, polypropylene fibrous batting, such as 6 ounce FABRINET™ manufactured by the Gundle Corporation) where evaporation occurs. The vaporized liquids are then vented out the exhaust vent 125. The vaporizer 107 may be covered with a PVC cap (not shown) to protect the drive motor 131. The vaporizer 107 is preferably mounted on a removable panel of the exhaust vent 125 so as to permit removal of the vaporizer 107 for servicing or replacement.

The vaporizer 107 is controlled by a liquid level sensor (not shown). When the liquid reaches a designated level, preferably approximately 2 inches above the high portion of the bottom of the ribbed container 101, the vaporizer is activated. The vaporizer 107 is also controlled by a temperature sensor which prevents the vaporizer from operating below a specified temperature, preferably about 40° F. to prevent the vaporizer from running when the process liquids are frozen.

The negative air pressure source 129, draws air through the central air duct 127 and exhaust vent 125. This air flow draws air through the waste piles 115 and also draws air through the open end 128 of the central air duct 127, thereby capturing any excess gas in the container 101 and preventing the escape of any malodorous gasses through the waste input chutes 107. The capacity of the negative air pressure source 129 is dependent upon the size of the central air duct 127. In a preferred embodiment of the present invention where the central air duct 127 is approximately 8 inches in diameter, the negative air pressure source 129 has a capacity of at least 500 ft.$^3$/min., and preferably more than approximately 1000 ft.$^3$/min. The negative air pressure source 129 should be adapted for continuous operation in a moist environment. In a preferred embodiment, the negative air pressure source 129 is an in-line electric exhaust motor fitted with a 10 inch diameter fan blade assembly, such as part #7F675 manufactured by the Dayton Company. The negative air pressure source 129 preferably operates continuously.

In a preferred embodiment of the present invention, all powered items, including the positive air pressure source 119, the vaporizer 107, and the negative air pressure source 129 are adapted to be powered by commercial electric power, solar electric power, wind electric power, thermoelectric power, small hydro electric power, or any combination thereof.

In a preferred embodiment of the present invention, the waste decomposition system 100 may comprise a control panel for manual control of the powered items and for displaying the status of the system. For example, the waste decomposition system may be provided with a sensor for detecting liquid overflow. The detector would activate a signal on the control panel advising the user of the liquid overflow status.

Figure 7:
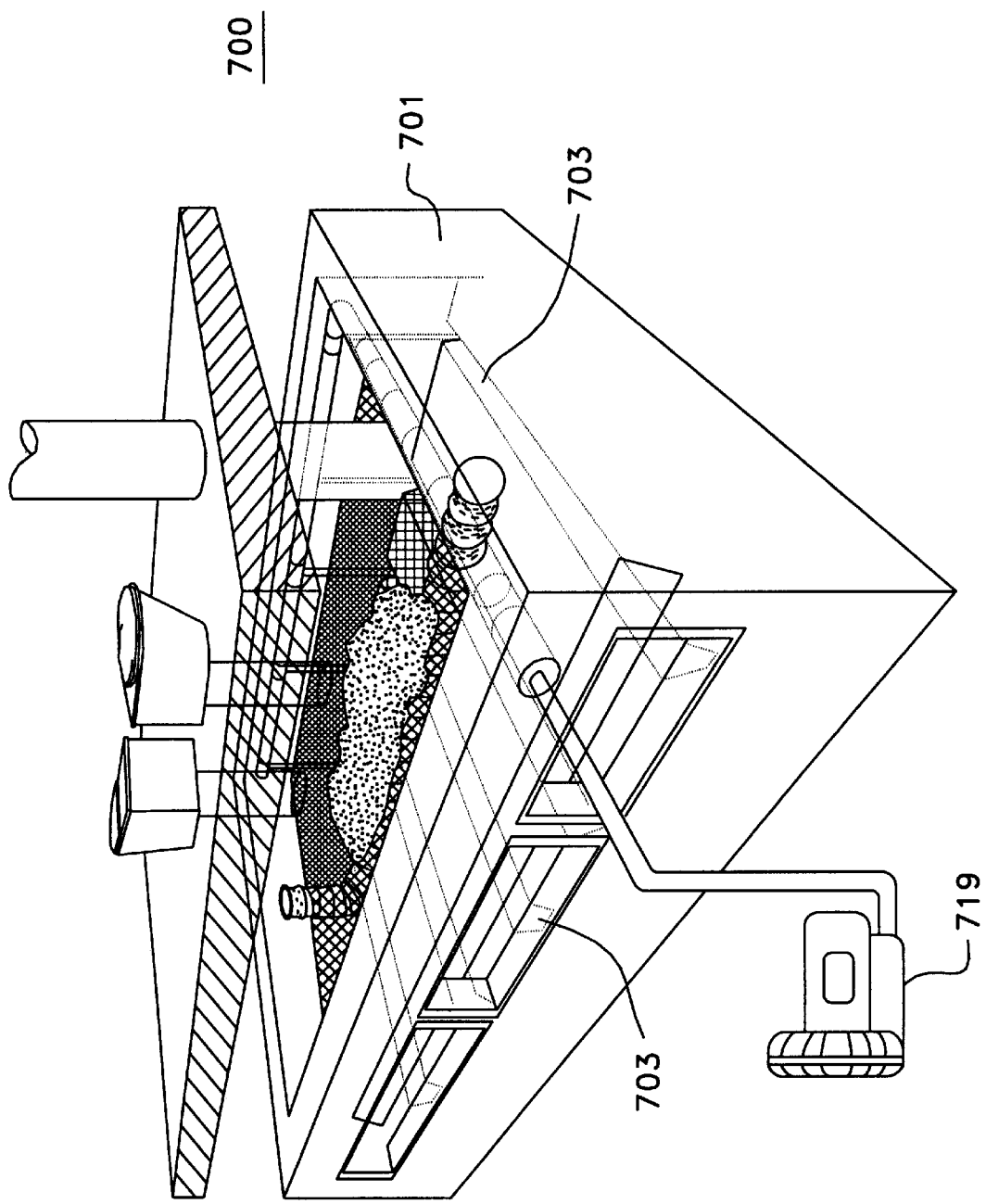
FIG. 7 is a perspective view of a waste decomposition system in accordance with an alternative preferred embodiment of the present invention.

In another alternative embodiment of the present invention, as shown in FIG. 7, a portion of or all of the basement or substructure of a building can serve as the container 701 for the waste decomposition system 700. In such a system, the channels 703 are formed in the material of the container 701. In addition, the container 701 should be sealed and waterproofed to prevent leakage. Dimensions and capacities of the elements of the air circulation system may be calculated in accordance with the usage and waste decomposition rates discussed above.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A waste decomposition apparatus comprising:
   a container comprising a plurality of recessed channels;
   one or more toilet fixtures suitable for receiving human toilet events;
   means for transporting said events to said container;
   a pervious membrane couple to the internal bottom of the container: and
   an air circulating system integrated into the container comprising:
      a. a positive air pressure source adapted to force air through the waste; and
      b. a negative air pressure source.

2. The system of claim 1, wherein the air circulation system further comprises a plurality of air diffuser pipes adapted to fit within the recessed channels.

3. The system of claim 1, wherein the air circulation system further comprises a central air duct coupled to the negative air pressure source.

4. The system of claim 3, wherein the air circulation system further comprises:
   an exhaust vent coupled to the central air duct; and
   a vaporizer positioned in the exhaust vent.

5. The system of claim 1, wherein the air circulation system further comprises a dehumidifier coupled to the positive air pressure source.

6. The system of claim 1, wherein the container functions as the substructure of a building.

7. The system of claim 1, wherein:
   the container comprises a plurality of recessed channels;
   the air circulation system further comprises a plurality of air diffuser pipes adapted to fit within the recessed channels;
   the air circulation system further comprises a central air duct coupled to the negative air pressure source;
   an exhaust vent coupled to the central air duct;
   a vaporizer positioned in the exhaust vent; and
   a dehumidifier coupled to the positive air pressure source.

8. A method for decomposition of liquid and solid organic waste, comprising the steps of:
   providing one or more toilet fixtures adapted to receive human toilet events containing liquid and organic solid waste;
   providing a container comprising a plurality of recessed channels for receiving and collecting said human toilet events;
   forcing air through the waste with a positive pressure source beneath the waste;
   withdrawing air from the container with a negative air pressure source; and
   further comprising the step of separating the liquid waste from the solid waste by providing a pervious membrane couple to the internal bottom of the container.

9. The method of claim 8, further comprising the step of dehumidifying the air forced through the waste by the positive air pressure source.

10. The method of claim 8, further comprising the step of vaporizing the liquid waste.

11. The method of claim 8 wherein said container also functions as the substructure of the building housing said one or more toilet fixtures.

* * * * *